(12) United States Patent
Frost et al.

(10) Patent No.: US 11,761,069 B2
(45) Date of Patent: Sep. 19, 2023

(54) AUTOMOTIVE COMPONENT WITH ENHANCED STRENGTH

(71) Applicant: BENTELER AUTOMOBILTECHNIK GMBH, Paderborn (DE)

(72) Inventors: Georg Frost, Steinheim (DE); Andreas Frehn, Delbrueck (DE); Karsten Bake, Delbrueck (DE); Martin Holzweissig, Paderborn (DE); Rainer Lapsien, Bueren-Wewelsburg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 78 days.

(21) Appl. No.: 17/093,801

(22) Filed: Nov. 10, 2020

(65) Prior Publication Data

US 2021/0140021 A1    May 13, 2021

(30) Foreign Application Priority Data

Nov. 11, 2019   (DE) .................... 10 2019 130 381.8

(51) Int. Cl.
| | |
|---|---|
| *C22C 38/38* | (2006.01) |
| *C22C 38/32* | (2006.01) |
| *C22C 38/22* | (2006.01) |
| *C22C 38/06* | (2006.01) |
| *C22C 38/02* | (2006.01) |

(Continued)

(52) U.S. Cl.
CPC .............. *C22C 38/38* (2013.01); *B21D 53/88* (2013.01); *C22C 38/002* (2013.01); *C22C 38/02* (2013.01); *C22C 38/06* (2013.01); *C22C 38/22* (2013.01); *C22C 38/26* (2013.01); *C22C 38/28* (2013.01); *C22C 38/32* (2013.01); *C25D 5/50* (2013.01)

(58) Field of Classification Search
CPC .................................. C23C 4/12; C22C 38/12
See application file for complete search history.

(56) References Cited

U.S. PATENT DOCUMENTS

| | | | | |
|---|---|---|---|---|
| 2007/0182176 | A1* | 8/2007 | Muskos | B60R 19/34 293/133 |
| 2010/0176610 | A1* | 7/2010 | Roll | B60R 19/18 293/120 |

(Continued)

FOREIGN PATENT DOCUMENTS

| | | |
|---|---|---|
| CN | 110066961 A | 7/2019 |
| EP | 2341156 B1 | 3/2017 |

(Continued)

OTHER PUBLICATIONS

Office Action for Chinese Application No. 202011248056.0 dated Sep. 1, 2021; 11pp.

(Continued)

*Primary Examiner* — Anthony M Liang
(74) *Attorney, Agent, or Firm* — HAUPTMAN HAM, LLP (57) ABSTRACT

An automotive component is produced by hot forming and press hardening a hardenable steel alloy having a tensile strength of at least 1700 MPa. The hardenable steel alloy, in addition to a balance made up of iron and melting-related impurities, has the following alloy elements carbon, niobium, and titanium. The automotive component is coated by a thermal coating process.

18 Claims, 6 Drawing Sheets

(51) Int. Cl.
    *C22C 38/00*     (2006.01)
    *C22C 38/26*     (2006.01)
    *C22C 38/28*     (2006.01)
    *C25D 5/50*     (2006.01)
    *B21D 53/88*     (2006.01)

(56) References Cited

U.S. PATENT DOCUMENTS

| | | |
|---|---|---|
| 2011/0182765 A1 | 7/2011 | Giefers et al. |
| 2013/0206284 A1 | 8/2013 | Norden et al. |
| 2014/0234659 A1* | 8/2014 | Kawata .................. C23C 2/28 |
| | | 148/504 |
| 2015/0284861 A1* | 10/2015 | Allely .................. C22C 38/48 |
| | | 148/530 |
| 2017/0297304 A1 | 10/2017 | Becker et al. |
| 2019/0226064 A1 | 7/2019 | Chiriac et al. |
| 2021/0008665 A1 | 1/2021 | Brugger |

FOREIGN PATENT DOCUMENTS

| | | |
|---|---|---|
| EP | 3200950 B1 | 12/2019 |
| WO | 2011157690 A1 | 12/2011 |
| WO | 2019185272 A1 | 10/2019 |

OTHER PUBLICATIONS

Office Action for Chinese Application No. 2020112480560 dated Jul. 5, 2022; 10pp.
Office Action for German Application No. 10 2019 130 381.8 dated Feb. 13, 2020; 11pp.

* cited by examiner

AUTOMOTIVE COMPONENT WITH ENHANCED STRENGTH

RELATED APPLICATIONS

The present application claims priority of German Application Number 102019 130381.8 filed Nov. 11, 2019, the disclosure of which is hereby incorporated by reference herein in its entirety.

FIELD

The present disclosure relates to a hot-formed, press-hardened automotive component. Said component is a bumper, or a bumper arrangement.

BACKGROUND

It is known practice from the prior art to dispose bumper arrangements at the front or at the ends of motor vehicles. Such bumper arrangements are also called crash management systems. In such systems, a cross-member, which extends substantially in the transverse direction of the motor vehicle and may have a curved structure, is coupled to the motor vehicle bodywork, with the incorporation of crash boxes.

Now, in the event of a high-intensity impact, the cross-member is required to possess high stiffness, whereas the crash boxes dissipate energy through deformation and convert crash energy into shape-change work.

It is therefore known practice from the prior art to produce the cross-members by means of hot forming and press hardening. In these operations, tensile strengths of in some cases more than 1500 MPa can be attained. The high strengths are also accompanied by a lower ductility, with the possible consequences of crack initiation and subsequent brittle fracture.

A further practice known from the prior art is to subject hot-formed and press-hardened components to a thermal aftertreatment. In this case, additional operating steps are required. For example, a thermal aftertreatment is carried out at 300 to 400° C. in order to enhance the ductility. At the same time, however, it also entails a significant diminishment of the strength.

SUMMARY

It is an object of the present disclosure to indicate an automotive component and also production thereof that exhibits enhanced strength properties relative to the prior art and at the same time has a lower susceptibility to brittle fracture, the automotive component being easy to produce from a technical production standpoint.

The object identified above is achieved with an automotive component produced by hot forming and press hardening from a hardenable steel alloy.

The automotive component is produced by hot forming and press hardening from a hardenable steel alloy. The component is a bumper support or a bumper arrangement, which is connected to crash boxes, and which is produced in the form of a weld-assembled component. However, other automotive components, bodywork components and structural components, may also be produced in accordance with the disclosure, and embody the associated qualities of high strength in conjunction with good ductility. A quality is the possibility of a high level of insensitivity to cracking in spite of high strengths Rm of more than 1600 MPa at the same time.

For this purpose a blank is provided, made from a hardenable steel alloy which in accordance with the disclosure, in addition to a balance made up of iron and melting-related impurities, comprises at least the following alloy constituents, expressed in percent by weight:

carbon (C): 0.33-0.37, or 0.33-0.35
niobium (NB): 0.02-0.06, or 0.03-0.05, or 0.04
titanium (Ti): 0.005-0.02, 0.005,-to max. 0.015, or 0.05-0.01.

A blank of this kind is austenitized, then hot-formed and press-hardened. In this way a tensile strength Rm of at least 1700 MPa is attained, greater than 1800 MPa and above 1850 MPa. The tensile strength may also comprise more than 2000 MPa, or greater than 2100 MPa.

In accordance with the disclosure, then, after the hot forming and press hardening, the component has been treated by a thermal coating process at a temperature of 150 to 450° C. This ensures that the coating adheres well at the surface of the component and/or becomes partly joined to the surface of the component, yet at the same time there is no significant influence on the microstructure of the component itself, in light of the low temperatures of below 450° C. The heat treatment of the thermal coating process is implemented with less than 30-minutes.

In accordance with the disclosure, the component thus produced is now coated with a cathodic e-coat coating process. The cathodic e-coat coating process is implemented as a thermal coating process at a temperature of between 150 and 250° C., or at 160 to 220° C. As a result of this process the following surprising inventive findings have arisen:

The alloy constituent niobium achieves a fineness of grain. The alloy constituent titanium binds the nitrogen in the microstructure. Titanium carbonitride is formed. Accordingly, as a result of the hot forming and press hardening, a component is provided which has a high strength but reduced brittle fragility.

As a result of the subsequent thermal treatment with the cathodic e-coat coating process, carbon atoms are accumulated at the dislocations. Dislocational movements are hindered as a result. Consequently, the tensile strength Rm initially established during hot forming and press hardening is reduced, but at the same time the yield strength Rp 0.2 and also the elongation at break are enhanced. Relative to the hot-forming and press-hardening operation alone, therefore, the component has a lower maximum strength (tensile strength), but at the same time an increased ductility or elongation at break and an enhanced yield strength. All in all, therefore, the component produced in accordance with the disclosure is less susceptible to brittle fracture, owing to a reduced tendency for crack initiation.

It removes the need for complex and costly aftertreatment processes, other coating processes and/or thermal aftertreatment processes. Such processes are typically carried out at well above 300° C., in order to produce a corresponding structural alteration within the steel material.

The automotive component is a bumper support, also called cross-member, and here is a bumper support arrangement with crash boxes. The crash boxes and also any further ancillary parts, such as a closing plate or the like, for example, are welded to the bumper support. The bumper support is then the component with high strength. This component may be a formed component, which for example is curved over its longitudinal extent and in the cross section itself takes the form of a hat-shaped profile. The other components may be formed of conventional steel alloys or likewise of hardenable steel. By virtue of the improved ductility of the bumper support, there is no detachment at the weld spots even in crash situations. When the arrangement has been welded together, the cathodic e-coat process is implemented. This is a cathodic deposition coating process which is implemented as a thermal aftertreatment process within the temperature limits identified above.

In addition, the steel alloy comprises at least one of the alloy elements listed below, expressed in percent by weight:

| | |
|---|---|
| silicon (Si) | 0.15-0.35 |
| manganese (Mn) | 1.1-1.5 |
| phosphorus (P) | max. 0.025 |
| sulfur (S) | max. 0.005 |
| aluminum (Al) | 0.01-0.08 |
| boron (B) | 0.001-0.003 |
| chromium (Cr) | 0.08-0.35 |
| Cr + Mo | 0.08-0.35. |

As a result of the alloy composition of the steel alloy, it is possible to achieve the presence of a tensile strength, after the cathodic e-coat process as well, of more than 1700 MPa, more than 1800 MPa, or more than 1900 MPa. The cross-member therefore has high stiffness. Deformation, like a critical deformation in a crash scenario, is therefore countered by the high stiffness.

The tensile strength Rm, however, ought to be limited to a realistic value of below 2500 MPa.

The yield strength Rp 0.2 continues, after the cathodic e-coat coating, to have a value of between 1350 and 1600 MPa, 1400 to 1600 MPa, or 1500 to 1600 MPa.

A respective delta of at least 50 MPa is recorded for the tensile strength and the yield strength. This means that the tensile strength decreases by at least 50 MPa during the cathodic e-coat process. The yield strength, conversely, increases by at least 50 MPa. The respective delta, however, is not greater than 200 MPa.

In the context of the disclosure, it is also possible for partially soft component regions to be present in the automotive component. These regions, then, would be formed as soft regions having a lower tensile strength. These partial component regions may be generated, for example, by means of differences in heating during the austenitizing operation, or alternatively by differences in cooling during the press hardening. It would likewise be possible to generate a controlled, partial thermal aftertreatment. The soft regions in that case would have a tensile strength Rm of less than 1200 MPa, 1100 MPa, and less than 1000 MPa, less than 900 MPa.

Furthermore, a reduced susceptibility to stress cracking corrosion is recorded. Here, the properties are ascertained in a graduated tensile test, according to the SEP 1970 Steel Iron Test Sheet.

The sample geometry according to SEP 1970 is used. The graduated tensile test is conducted according to DIN 50969-3-2018-06. Specifically, the test is commenced at 50 Rmk (notched tensile strength) and continued with an hourly increase in the load by 5% until the samples fail. The surrounding medium used is 5% NaCl with spot-welded galvanized metal sheet. The maximum load level attained on the automotive component produced in accordance with the disclosure, F/FmK, was 70%.

In addition, the automotive component has a skin-decarburized layer. The skin-decarburized layer has a layer thickness of around 5 to 70 μm, or 10 to 40 μm. The carbon content in the skin-decarburized layer is 20% lower than the carbon content in the stratum of the automotive component of the disclosure produced by hot forming and press-hardened.

The automotive component is produced by the method described below.

The method of the disclosure for producing an automotive component envisages using a hot-forming and press-hardening operation. For this purpose, a blank made of a hardenable, carbon-containing steel alloy is heated at least in regions, or completely, to above AC3 temperature. The carbon content is greater than 0.33% by weight. However, the carbon content should not be more than 0.37% by weight. The blank for heating is heated in a heating installation. The heated blank is removed from the heating installation and transferred into a hot-forming and press-hardening mold. In the hot-forming and press-hardening mold, a hot-forming process and also a press-hardening operation are conducted. The heating installation may be a continuous furnace, multiple hearth furnace or batch furnace. The heating procedure described is also not confined just to radiant heating in a furnace atmosphere. An inductive heating and/or else a contact heating may also be implemented. These heating operations are then likewise carried out under an inert gas atmosphere or controlled atmosphere. A further possibility is for the heating installation to have two parts—for example, a continuous furnace and a multiple hearth furnace, or alternatively a contact heating station and a multiple hearth furnace. The heating technique for producing the skin-decarburized layer is described below with reference—as an example—to a continuous furnace.

An ultra high-strength steel alloy is used here, with which it is possible to provide an automotive component having a tensile strength Rm of at least 1700 MPa on completion of the press-hardening operation.

In order that this automotive component, also called component, having ultra high-strength properties has, as it were, a high degree of ductility, like a bending angle of greater than 50°, or greater than 60°, skin decarburization is implemented during the heating in the continuous furnace. The bending angle is initially measured in a plate bending test according to VDA238-100, and is subsequently multiplied by the square root of the metal sheet thickness. As a result, a standardized bending angle is defined.

It is envisaged that a furnace atmosphere within the continuous furnace is established through the supply of ambient air and of nitrogen of technical-grade purity. In the continuous furnace, the oxygen content in percent by volume is measured in the furnace atmosphere. According to the disclosure, an oxygen content of 0.5-15 vol %, between 0.5 and 10 vol %, between 0.5 and 5 vol %, or between 0.5 and 3 vol % is established in the furnace atmosphere. The oxygen content is established through the closed-loop control of the nitrogen volume flow rate into the continuous furnace.

It has emerged in accordance with the disclosure that it is possible in this way to implement skin decarburization on the blank to be heated, in such a way that the carbon atoms in a respective skin layer of the blank to be heated undergo bonding to the oxygen. By virtue of the respectively skin-decarburized layer, the component produced later by hot forming and press hardening has a higher ductility, flexural ductility or skin ductility. The furnace residence time or heating time for skin decarburizing is 2 to 6 minutes, 3 to 5 minutes, with the furnace atmosphere or inert gas atmosphere during heating being adjusted, through nitrogen supply and oxygen content, in such a way that complete carbon depletion or complete decarburizing in the skin-decarburized layer is prevented.

The supply of ambient air may be accomplished by feeding the air from the outside into the interior of the furnace. However, the air or the oxygen in the interior of the furnace comes from the immediate environment of the continuous furnace.

It has been found here, in accordance with the disclosure, that when a skin-decarburized layer having a layer thickness of 10-70 μm above or between 10 and 50 μm and of 20 to 40 μm is established on either side of the component, such that an automotive component having a tensile strength Rm of greater than 1800 MPa and a bending angle of greater than 50°, or greater than 60°, can be produced.

It is also possible to implement the method of the disclosure in existing production plants, by retrofitting a nitrogen supply, and also a closed-loop control method for establishing the oxygen content in the furnace atmosphere, in an existing continuous furnace.

A continuous furnace is typically operated with gas burners in jet pipes. The combustion process itself takes place separately from the establishment of the oxygen content in the furnace atmosphere. Alternatively, jet pipes can be implemented in resistance-heated form.

It has also been found that the nitrogen, relative to the spatial direction, can be introduced into the continuous furnace above the blanks that are to be heated. This generates convection behavior on the part of the nitrogen within the continuous furnace, such that no further mixing of the internal furnace atmosphere is required.

The method of the disclosure can be used to process tailored blanks. The tailored blanks are rolled blanks. However, it is also possible to process tailored formed blanks or tailored welded blanks or patched blanks.

It is also possible of course, as it were, to process blanks having constant wall thickness. It has emerged that a cross-member or bumper support is provided with a patch. The cross-member extends substantially over a major part of the width of the motor vehicle. The patch extends over a width of 30% to 80% between the attachment faces of a crash box. As a result of the patch, the cross-member can be produced from a less costly or lower-strength material. The patch itself is in that case produced from a high-strength material having a tensile strength of more than 2000 MPa. This achieves high stiffness on the part of the cross-member.

A potential buckling point in the cross-member in the region of the patch is avoided. Buckling itself is distributed, as a result of the stiffening produced by the patch, to the outer sides further outward, to two possible buckling points.

Furthermore, it is likewise possible with the method of the disclosure to undertake additional coating on the component produced. This may entail a subsequently applied anticorrosion coating, for example cathodic electrocoating or zinc diffusion coating.

It has also been found that the blank can traverse the furnace within a period of 120 sec to 400 sec, 160 sec to 300 sec, or 160 sec to 250 sec.

There is further provision for a temperature of between 910 and 980° C., or of 930-960° C., to prevail in the furnace itself.

Alternatively or additionally, provision may be made for the temperature in the furnace to be at least 5%, 10%, 15%, or 20% above the AC3 temperature of the steel alloy used. However, the internal furnace temperature ought not to exceed the AC3 temperature of the steel material used by 40%, not by 30%.

In the context of the disclosure, therefore, the method can be carried out with the steel alloy described above. The method may alternatively be carried out with other carbon-containing steel alloys, having a carbon content of greater than 0.3 percent by weight. The automotive component described below may likewise have been produced from the aforesaid steel alloy. However, the carbon content ought not to exceed 0.4 percent by weight.

The automotive component additionally possesses a high ductility. The ductility is manifested, for example, in the fact that there is a bending angle of greater than 50°, or greater than 60°, on the automotive component.

The automotive component typically has a thickness of between 0.7 mm and 3.5 mm. Each surface of the automotive component carries the applied coating from the cathodic e-coat process, and also, below it, has a skin-decarburized layer, with the skin-decarburized layer having a layer thickness of 5 to 70 μm, or of 10 to 40 μm.

It is a feature of a layer boundary from skin-decarburized to non-skin-decarburized layer that in the skin-decarburized layer the carbon content corresponds to max. 20% in relation to a core layer, i.e. a middle stratum, of the automotive component produced. This means that, coming from the surface, the skin-decarburized layer ends at the point where the carbon content in the direction toward the interior of the automotive component exceeds 50% of the carbon content of a middle stratum of the automotive component. These figures are likewise applicable to the production method described above.

BRIEF DESCRIPTION OF THE DRAWINGS

The above-stated disclosure is additionally described by the elucidations which follow, and illustrated by the schematic figures, which are intended to serve for easy understanding of the disclosure.

In the drawings.

The figures use the same reference numerals for identical or similar components, even when there is no repeated description on grounds of simplification.

DETAILED DESCRIPTION

Figure 1:
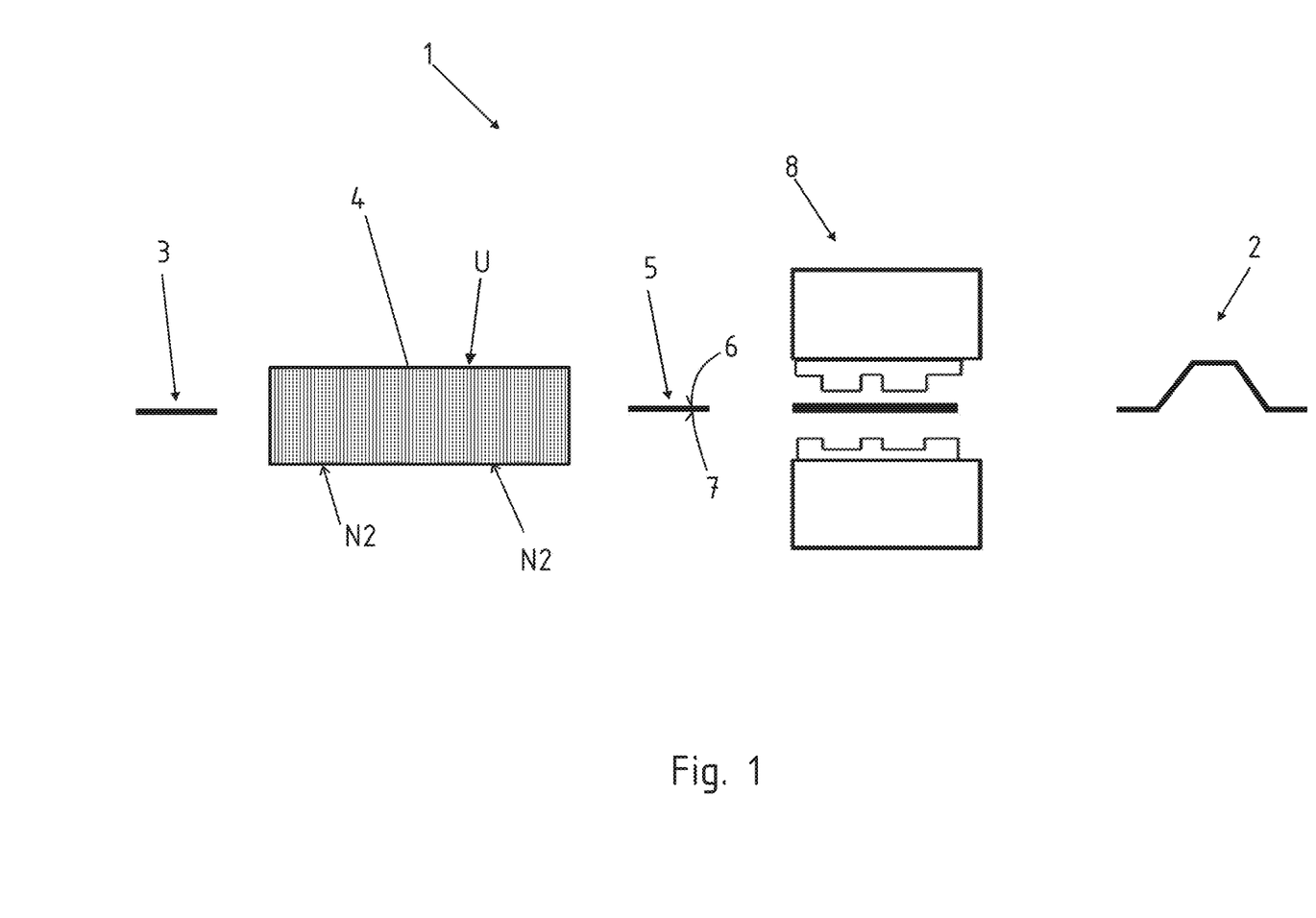
FIG. 1 shows a schematic method progression for production of an automotive component, FIGS. 2a and b show an automotive component produced in accordance with the disclosure, in the form of a cross-member arrangement, in a perspective front view and rear view.

FIG. 1 shows a hot-forming line of the disclosure for producing an automotive component produced by hot forming and press hardening.

First of all, a blank 3 is inserted into a continuous furnace 4. The continuous furnace 4, for adjustment of the furnace atmosphere within the continuous furnace 4, is supplied with ambient air U. The continuous furnace 4 is also supplied with nitrogen N2 of technical-grade purity. The amount of nitrogen N2 of technical-grade purity supplied is adjusted as a function of the percentage proportion by volume of oxygen measured within the furnace atmosphere. For this purpose, for example, multiple measurement sites that measure the percentage proportion by volume of oxygen may be present within the continuous furnace 4. From the measurement sites, an average may then be formed. The blank 5 thus heated has an already skin-decarburized layer at each surface 6, 7. The heated blank 5 is then transferred into a hot-forming and press-hardening mold 8, where it is hot-formed and press-hardened. The automotive component 2 produced is removed from the hot-forming and press-hardening mold 8 and—without further illustration—is sent to the cathodic e-coat coating process.

Figure 2A:
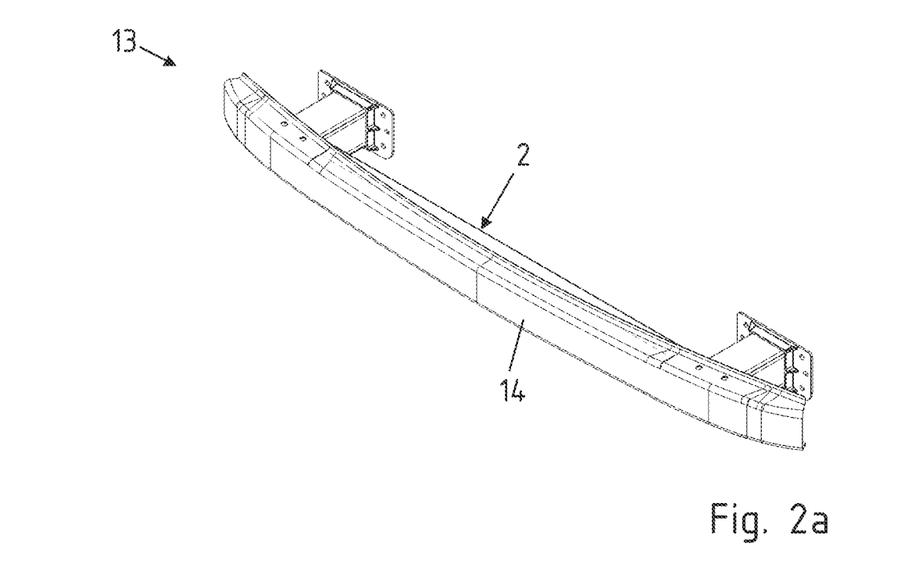
Figure 2B:
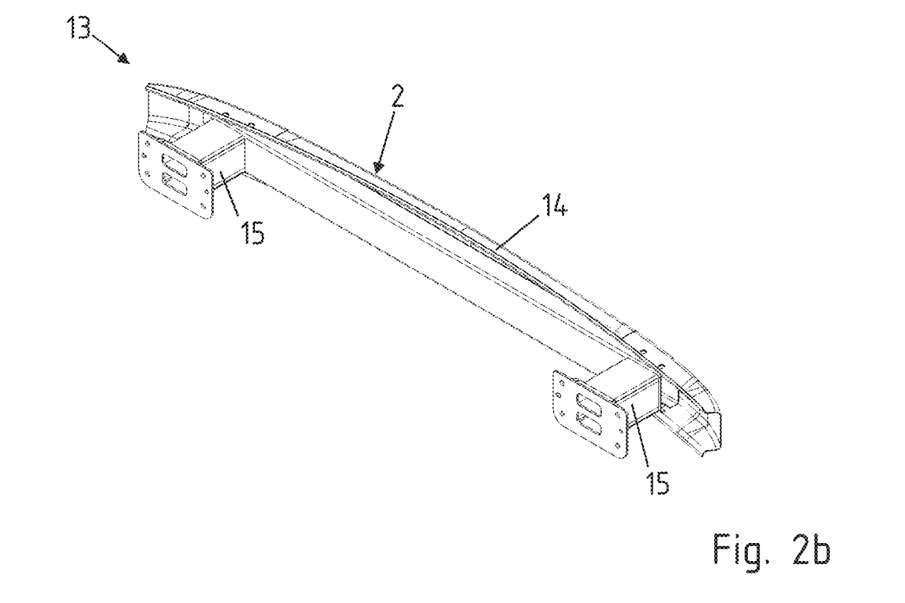

FIGS. 2a and 2b show an automotive component 2 of the disclosure in the form of a bumper arrangement 13 or cross-member. The automotive component 2 is in this case designed in the form of in the form of a cross-member. This member may take the form, for example, of a cross-member or bumper 14. In accordance with the disclosure it is equipped with a tensile strength of more than 1700 MPa. Crash boxes 15 are attached on the cross-member 14. The crash boxes 15 are formed from a deformable steel material or metallic material. The crash boxes are welded to the cross-member 14. Subsequently, the entire bumper arrangement 13 is then treated by the thermal coating process. The cross-member may take the form of a single-shelled component, and may have a hat-shaped cross section, for example. The cross-member may also be coupled to a closing plate. Soft regions may be present in the attachment points of the crash boxes and/or at the flanges of a hat profile.

However, it is possible to produce further automotive components 2, structural automotive components, by the method of the disclosure. These further automotive components 2 are, for example, longitudinal members, cross-members, struts, roof members, sills or similar components of a motor vehicle body, or frame structure parts of a drive battery box.

Figure 3:
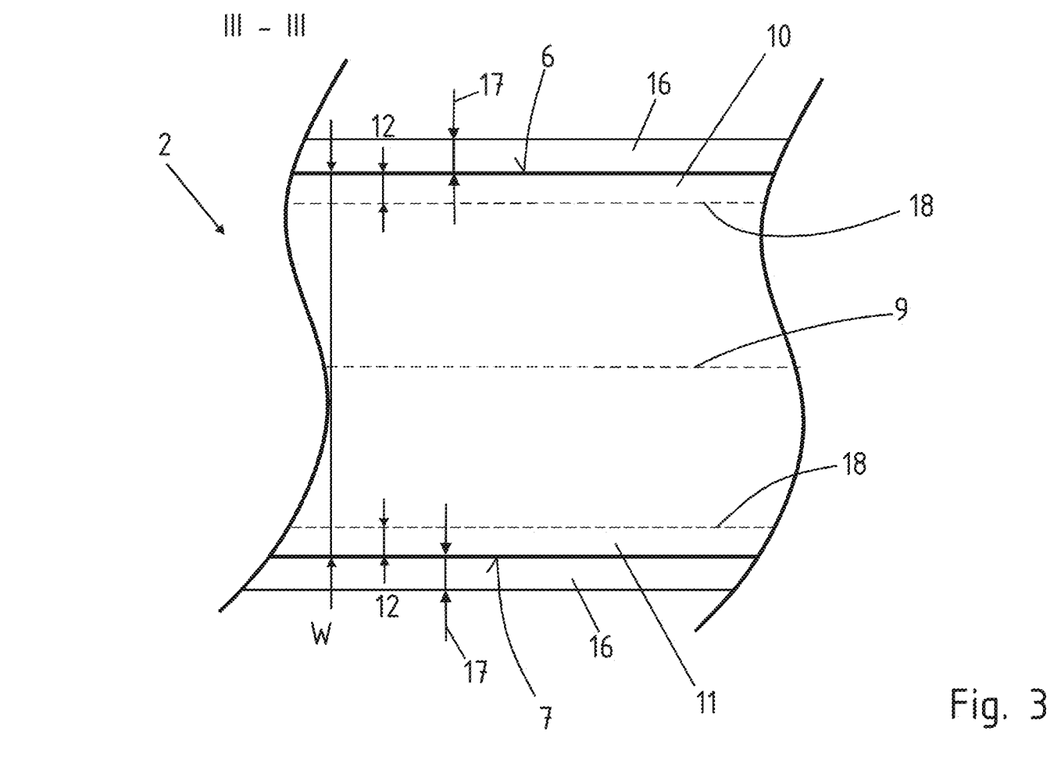
FIG. 3 shows a cross-sectional view through an automotive component of the disclosure.

FIG. 3 shows a cross-sectional view according to the section line III-III from FIG. 2 through the automotive component 2 produced. The automotive component 2 has a wall thickness W. This thickness is 0.7-3.5 mm. From each surface 6, 7 of the automotive component 2, a skin-decarburized layer 10, 11 extends to a middle stratum 9 or else referred to as core layer or core stratum. The skin-decarburized layer 10, 11 has a layer thickness 12. The layer thickness 12 is 20-40 μm. It is a feature of a layer boundary 18 from skin-decarburized layer 10, 11 to non-skin-decarburized material that the carbon content in the skin-decarburized layer comprises 20% of the carbon content of the middle stratum 9. If, therefore, the carbon content, proceeding from the respective surface 6, 7 of the automotive component produced, exceeds 20%, it can no longer be referred to as a skin-decarburized layer in the context of the disclosure. In addition to the wall thickness w of the metallic component, there is then also in each case the cathodic e-coat coating 16 disposed on the surface of the metallic component. This coating 16 has a layer thickness 17. This layer thickness 17 is 15 to 70 μm, 15 to 30 μm or 30 to 60 μm.

Figure 4:
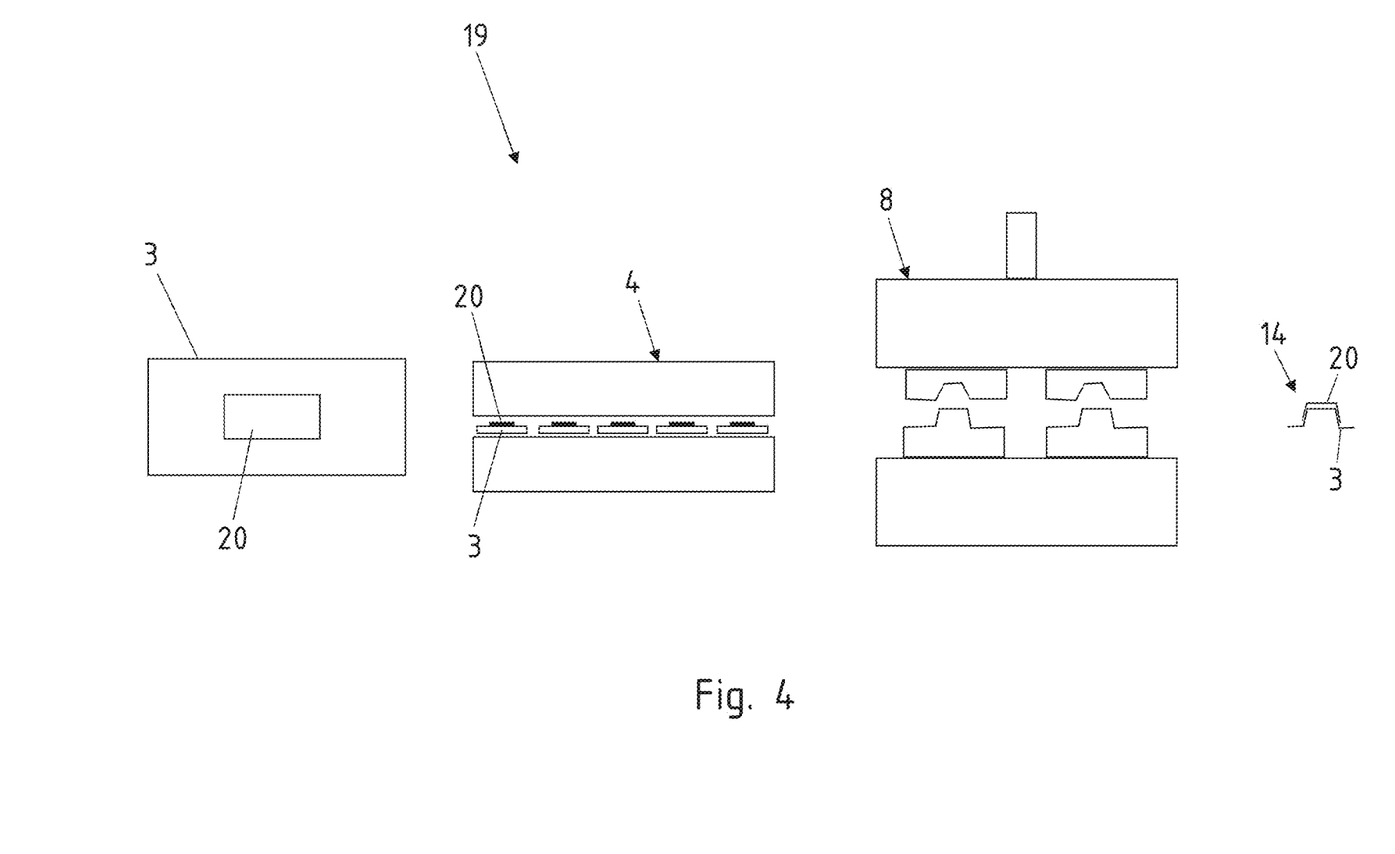
FIG. 4 shows a process line for producing patched components.

FIG. 4 shows a process line for producing a patched component. For this purpose, a blank 3 is provided with a patch 20. Coupling is accomplished, for example, by spot welding or by linear or circular thermal joining by means of lasers. The blanks 3 with patch 20 that are provided are subsequently heated, for example, in a continuous furnace, under an inert gas atmosphere. In turn, subsequently, in a hot-forming and press-forming mold 8, for example, in duplicate, a respective component is produced, having a reciprocating profile shape in cross section with the mounted patch 20.

Figure 5A:
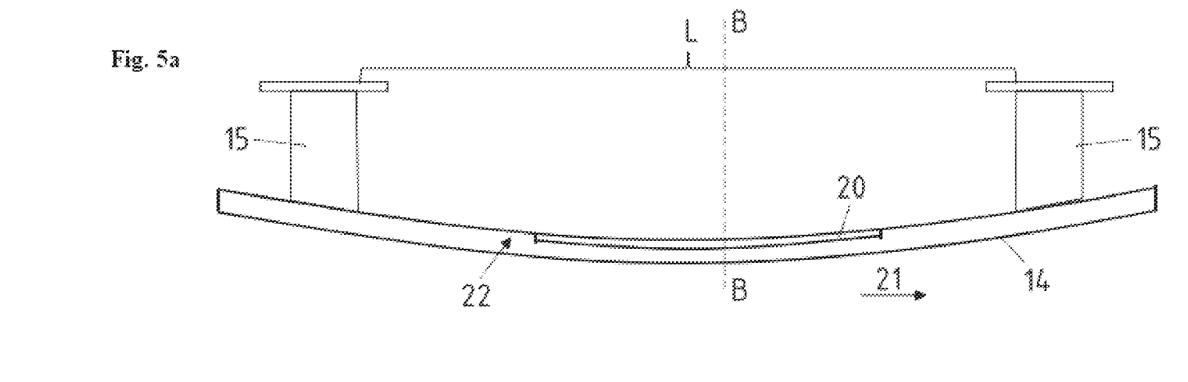
FIGS. 5a and 5b show a cross-member in plan view and cross-sectional view.
Figure 5B:
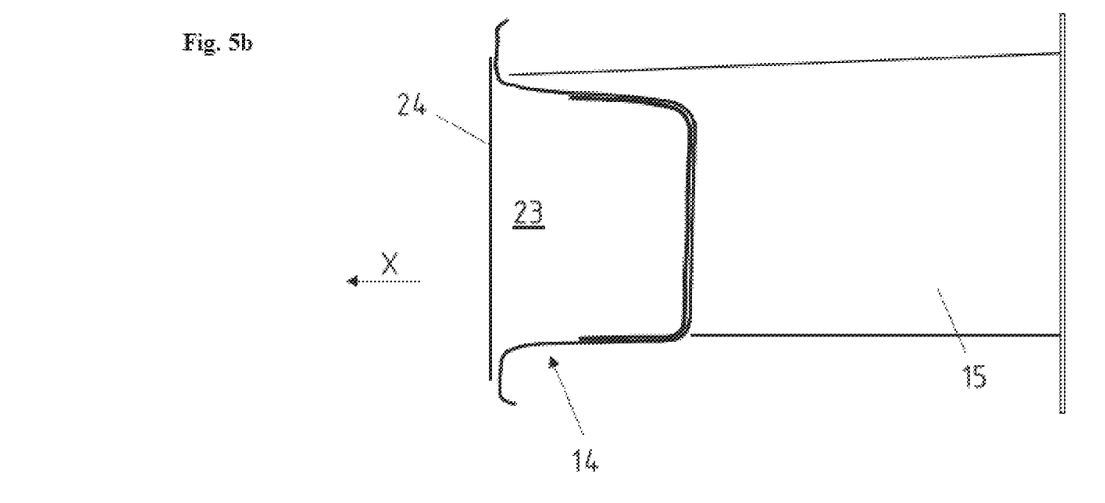

FIGS. 5a and 5b show a plan view and a cross-sectional view along the section line B-B. The cross-member is coupled to respective crash boxes 15 with a motor vehicle that is not shown in any more detail. A mounted patch 20 extends over a longitudinal direction 21 of the cross-member 14, over a length of around 30% to 80% of the distance L between the attachment points of the crash boxes themselves. This distributes a potential buckling point 22 to the sides of the patch in the event of a middle collision. The cross-member 14 itself may be produced, for example, from an MnB5 material 22. The patch is produced from the material according to the disclosure, which has a tensile strength of greater than 2000 MPa. The cross-member 14 is shown again in cross section in FIG. 5b. It is a single-sidedly open hollow profile or hat profile. The opening of the hat profile is oriented forward, relative to the longitudinal direction X of the motor vehicle, and so points away from the crash box. The patch 20 is disposed on the inside in the hat profile. There is a closing plate arranged. The closing plate may be formed continuously over the entire width of the cross-member 14. Alternatively the closing plate 24 may extend only over a part in the longitudinal direction.

Figure 6A:
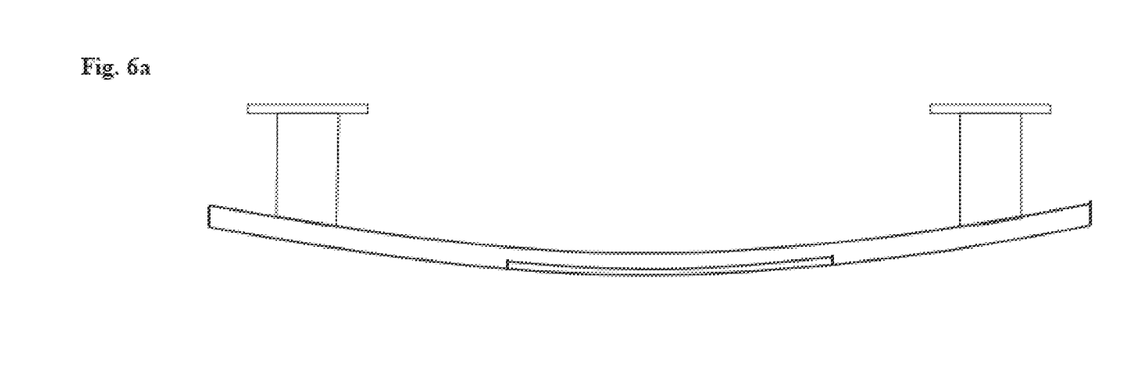
FIGS. 6a and 6b show an alternative design variant in plan view and cross-sectional view.
Figure 6B:
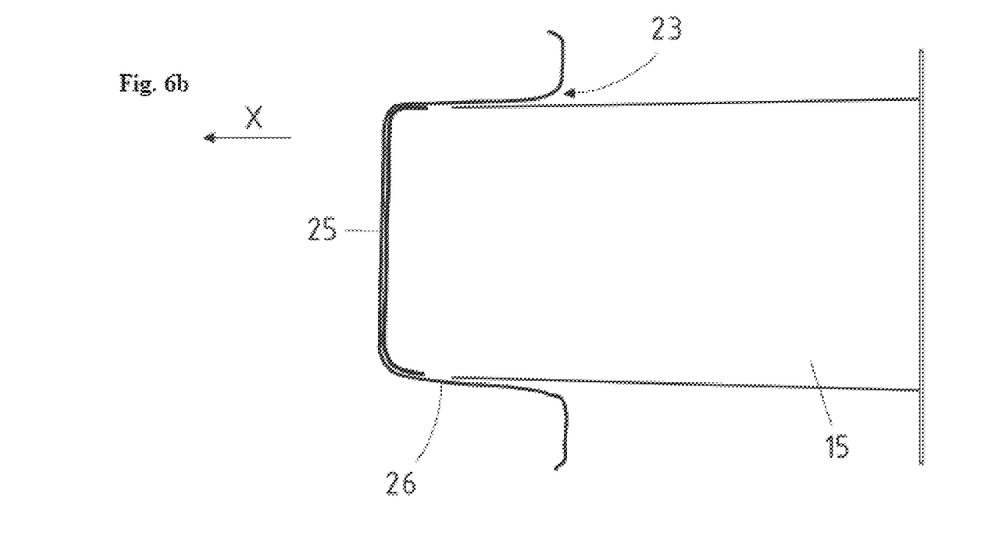

FIG. 6b shows an alternative design variant to this. In this case the opening 23 in the hat profile is arranged with an orientation pointing backward to the motor vehicle longitudinal direction X. Consequently there is also no need for a closing plate in this design variant. Common to both variants is the fact that the patch 20 extends over the cross section and over the cross-piece and also in each case a part of the leg. The patch 20 extends over a region of 10% to 30%, or 15% to 25%, of a respective leg length in the X-direction of the motor vehicle.

The foregoing description of some embodiments of the disclosure has been presented for purposes of illustration and description. It is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

The invention claimed is:

1. A hot formed and press hardened automotive component, comprising:
   a steel alloy having a tensile strength of at least 1700 MPa; and
   first and second skin-decarburized layers,
   wherein the steel alloy comprises a composition of the following alloy elements expressed in percent by weight, in addition to a balance of iron and impurities:
   carbon (C): 0.33-0.37,
   niobium (Nb): 0.02-0.06,
   titanium (Ti): 0.005-0.02,
   the automotive component has a thermal coating layer coated by a thermal coating process at a temperature of 150° C. to 450° C.,
   the first skin-decarburized layer is disposed at a first surface of the automotive component,
   the second skin-decarburized layer is disposed at a second surface of the automotive component, a carbon content in the skin-decarburized layers is at least 20% lower than in a middle stratum of the automotive component, and the middle stratum is disposed between the skin-decarburized layers.

2. The automotive component according to claim 1, wherein the automotive component has a tensile strength Rm of greater than 1800 MPa.

3. The automotive component according to claim 1, wherein the automotive component is a bumper support.

4. The automotive component according to claim 1, wherein a total of a titanium content and a niobium content of the titanium and the niobium alloy elements is between 0.02 and 0.08 wt %, wherein the titanium content is greater than the niobium content by 0.01 wt %.

5. The automotive component according to claim 1, wherein the thermal coating process is implemented as a cathodic e-coat coating process at a temperature between 150° C. and 250° C. in a time of 1 to 30 minutes.

6. The automotive component according to claim 1, wherein at least one of the further alloy elements listed below is contained in the steel alloy, expressed in percent by weight:

| | |
|---|---|
| silicon (Si) | 0.15-0.35 |
| manganese (Mn) | 1.1-1.5 |
| phosphorus (P) | max. 0.025 |
| sulfur (S) | max. 0.005 |
| aluminum (Al) | 0.01-0.08 |
| boron (B) | 0.001-0.003 |
| chromium (Cr) | 0.08-0.35 |
| Cr + Mo | 0.08-0.35. |

7. The automotive component according to claim 5, wherein the automotive component has a yield strength RP0.2 of 1350-1600 MPa after the cathodic e-coat coating.

8. The automotive component according to claim 1, wherein the skin-decarburized layers have a layer thickness of 5 to 70 μm.

9. The automotive component according to claim 1, wherein the automotive component has a tensile strength Rm of greater than 1850 MPa.

10. The automotive component according to claim 1, wherein the automotive component is a bumper arrangement with crash boxes comprising a weld-assembled component.

11. The automotive component according to claim 1, wherein the thermal coating process is implemented as a cathodic e-coat coating process at a temperature of between 150° C. and 250° C. in a time of 10 to 30 minutes.

12. The automotive component according to claim 1, wherein the skin-decarburized layers are disposed below the thermal coating layer.

13. The automotive component according to claim 1, wherein the skin-decarburized layers have a layer thickness of 10 to 40 μm.

14. The automotive component according to claim 1, wherein the steel alloy comprises the following element expressed in percent by weight: carbon (C): 0.33-0.35.

15. The automotive component according to claim 1, wherein the steel alloy comprises the following element expressed in percent by weight: niobium (Nb): 0.03-0.05.

16. The automotive component according to claim 1, wherein the steel alloy comprises the following element expressed in percent by weight: titanium (Ti): 0.005-0.015.

17. The automotive component according to claim 1, wherein the steel alloy comprises the following element expressed in percent by weight: titanium (Ti): 0.005-0.01.

18. A method of forming an automotive component, the method comprising:

hot forming and press hardening a hardenable steel alloy to a tensile strength of at least 1700 MPa to obtain the automotive component, the automotive component further comprising first and second skin-decarburized layers, wherein the hardenable steel alloy comprises a composition of the following alloy elements expressed in percent by weight, in addition to a balance of iron and impurities:

carbon (C): 0.33-0.37,
niobium (Nb): 0.02-0.06,
titanium (Ti): 0.005-0.02; and coating the automotive component with a thermal coating layer by a thermal coating process at a temperature of 150° C. to 450° C., wherein the first skin-decarburized layer is disposed at a first surface of the automotive component, the second skin-decarburized layer is disposed at a second surface of the automotive component, a carbon content in the skin-decarburized layers is at least 20% lower than in a middle stratum of the automotive component, and the middle stratum is disposed between the skin-decarburized layers.

* * * * *